(12) United States Patent
Thresh et al.

(10) Patent No.: US 12,436,828 B2
(45) Date of Patent: Oct. 7, 2025

(54) METHOD AND SYSTEM FOR COMPENSATING FOR A CRASH EVENT DURING DISPLAY OF A VIRTUAL ENVIRONMENT ON A VIRTUAL REALITY HEADSET

(71) Applicant: Sony Interactive Entertainment Europe Limited, London (GB)

(72) Inventors: Lewis Thresh, London (GB); Christopher Buchanan, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 0 days.

(21) Appl. No.: 18/656,779

(22) Filed: May 7, 2024

(65) Prior Publication Data

US 2024/0378100 A1    Nov. 14, 2024

(30) Foreign Application Priority Data

May 9, 2023   (GB) .................................... 2306782

(51) Int. Cl.
  *G06F 11/07*  (2006.01)
  *G06F 3/01*   (2006.01)
  *G06T 15/00*  (2011.01)

(52) U.S. Cl.
  CPC .......... *G06F 11/0706* (2013.01); *G06F 3/012* (2013.01); *G06T 15/005* (2013.01)

(58) Field of Classification Search
  CPC ..... G06F 11/0706; G06F 3/012; G06T 15/005
  See application file for complete search history.

(56) References Cited

U.S. PATENT DOCUMENTS

| 11,563,513 | B1 | 1/2023 | Lohr |
| 2012/0105473 | A1 | 5/2012 | Bar-Zeev et al. |
| 2019/0208181 | A1* | 7/2019 | Rowell ................ H04N 9/8205 |
| 2022/0326527 | A1 | 10/2022 | Taylor et al. |
| 2024/0098234 | A1* | 3/2024 | Friedman ............ H04N 13/344 |

OTHER PUBLICATIONS

Combined Search and Examination Report for Application No. GB2306782.0 dated Nov. 9, 2023, pp. 1-7.

* cited by examiner

*Primary Examiner* — Jigar P Patel
(74) *Attorney, Agent, or Firm* — Fish & Richardson P.C.

(57) ABSTRACT

A method for compensating for a crash event during display of a virtual environment on a virtual reality, VR, headset, the method comprising: receiving virtual display content representing a virtual environment, tracking the orientation of the VR headset, rendering and displaying virtual display content according to the orientation of the VR headset during normal operation, prior to a crash event; rendering future virtual display content associated with a plurality of possible orientations of the VR headset; detecting a crash event, preventing further rendering of virtual display content; and displaying a virtual display sequence based on the rendered future virtual display content after the crash event to prevent a sudden stop in the display of the virtual environment.

17 Claims, 2 Drawing Sheets

METHOD AND SYSTEM FOR COMPENSATING FOR A CRASH EVENT DURING DISPLAY OF A VIRTUAL ENVIRONMENT ON A VIRTUAL REALITY HEADSET

CROSS-REFERENCE TO RELATED APPLICATION

The present application claims priority from United Kingdom Patent Application No. GB2306782.0, filed May 9, 2023, the disclosure of which is hereby incorporated herein by reference.

FIELD OF THE INVENTION

The present invention relates to a method and a system for compensating for a crash event during display of a virtual environment on a virtual reality headset.

BACKGROUND

Virtual Reality (VR) is a computer-simulated environment that simulates a user's presence in real or imaginary environments, such that the user feels as though they are physically in that environment. Presenting VR environments to a user may include displaying stereoscopic scenes, using a computer or stereoscopic display, to enhance the illusion of depth in the scenes. The VR environment can additionally include sounds presented through speakers or headphones and haptic feedbacks presented using a handheld controller or other haptic device. In particular, VR is often used to provide an immersive and interactive experience of a game played by the user to enhance their gaming experience.

However, despite the realistic experience presented by VR, the VR system may be susceptible to crash events. A crash event can occur when the gaming visuals suddenly "crash" such that there is no longer virtual display content being rendered and displayed to the user. In particular, a crash event may occur when there is a rapid change in the in the visuals presented to the user during gameplay, for example, when there is a teleportation effect within the game, when there is a sudden change of scenery in the game or when the game comes to an end.

Additionally, a crash event may occur when a gaming engineer is designing the game, particularly at the debugging stage of design. To experience the VR as the user of the game would experience it or to locate bugs (i.e. coding errors) in a computer program, the engineer will typically put on a wearable VR headset and run the code, such to experience the visuals created by said computer program. However, when a bug is present, there will likely be a sudden stop or freeze in the visual signal outputting by the display, resulting in a crash event.

When there is a sudden change in visuals, the user may experience a jarring sensation of a sudden stop. A jarring sensation can occur when motion is perceived visually but the body is physically at rest. This is because the brain determines factors such as orientation, balance, position, and movement of a body using combinations of signals received from various parts of anatomy, including eyes, ears, and muscles. When these signals from multiples sources do not align, the user can experience an uncomfortable jarring sensation. In other words, the body is not experiencing motion or accelerating forces consistent with those visually perceived such that there is a disconnect between the signals received from the eyes and that of the musculoskeletal system when there is a sudden crash in the visuals of a VR system.

Therefore, there is a need to compensate for a crash event during display of a virtual environment in order to reduce the risk of a user or engineer experiencing a jarring or sudden stop sensation during display of a virtual environment.

SUMMARY

It is an object of the present invention to provide methods and systems which makes progress in solving some of the problems identified above.

In accordance with a first aspect of the invention there is provided a method for compensating for a crash event during display of a virtual environment on a virtual reality, VR, headset, the method comprising: receiving virtual display content representing a virtual environment, tracking the orientation of the VR headset, rendering and displaying virtual display content according to the orientation of the VR headset during normal operation, prior to a crash event; rendering future virtual display content associated with a plurality of possible orientations of the VR headset; detecting a crash event, preventing further rendering of virtual display content; and displaying a virtual display sequence based on the rendered future virtual display content after the crash event to prevent a sudden stop in the display of the virtual environment.

The virtual display content may comprise a movie, a street-level tour and, preferably a video game, which is displayed to the user to simulate a user's presence in the virtual environment of said movie, tour or video game. Future virtual display content comprises display content associated with the same virtual environment as that of the virtual display content, but at a future point in time. For example, in the context of gameplay, future virtual display content is display content associated with the virtual environment at a more advanced stage of gameplay. The future virtual display content is preferably rendered ahead of time i.e. it is pre-rendered. Throughout this specification, the term "pre-rendered" may be used to refer to rendering content ahead of time. In particular "pre-rendered" may refer to rendering display content associated with a predicted future passage of gameplay.

Preferably the virtual display sequence (i.e. the post-crash virtual display sequence) follows from the virtual display content displayed prior to the crash. In particular, the virtual display content displayed prior to the crash transitions seamlessly to the virtual display sequence. In other words, the virtual display content displayed prior to the crash and the virtual display sequence displayed post-crash even form a continuous image sequence. The method therefore provides an unbroken (i.e. non-disrupted or "continuous") view of the virtual environment through the crash event.

Preferably rendering future display content comprises rendering display content associated with a predetermined time period into the future, i.e. a predetermined time period starting at the current point in time. Preferably the method comprises continually rendering future display content for a predetermined time period. For example the method comprises continually rendering virtual display content associated with an upcoming passage of gameplay, for example a predicted passage of gameplay.

Preferably the method may comprise: receiving virtual display content representing a virtual environment; tracking the orientation of the VR headset, rendering and displaying virtual display content representing the virtual environment at a current point in time and according to the orientation of the VR headset; rendering future virtual display content, representing the virtual environment at a future point in time (preferably over a future time period starting from the current point in time), where the future display content is rendered for a plurality of possible orientations of the VR headset; detecting a crash event, preventing further rendering of virtual display content; and displaying a virtual display sequence based on the rendered future virtual display content after the crash event to prevent a sudden stop in the display of the virtual environment.

Preferably the method may comprise a method for compensating for a crash event during display of a virtual environment of a video game on a virtual reality, VR, headset, the method comprising: receiving virtual display content representing a virtual environment of the videogame at a current point in the gameplay, tracking the orientation of the VR headset, rendering and displaying virtual display content according to the orientation of the VR headset during gameplay, prior to a crash event; rendering future virtual display content representing the virtual environment associated with a plurality of possible orientations of the VR headset over a future period of gameplay from the current point in time; detecting a crash event, preventing further rendering of virtual display content; and displaying a rendered virtual display sequence based on the rendered future virtual display content after the crash event to prevent a sudden stop in the display of the virtual environment.

Often, virtual display content, particularly virtual display content of a video games, comprises undesired effects such as a sudden stop or a teleportation effect in the display content, for example a sudden change in scenery or end of scene, causing the user to feel a jarring sensation during or after the undesired event. Such undesired effects can be referred to as "crash events" due to the sudden or rapid change in the virtual display content provided to the user. Advantageously, the present method includes rendering future virtual display content and displaying a virtual display sequence based on the rendering future virtual display content, whereby the term "pre-rendering" refers to rendering the content ahead of time (i.e. the content is rendered at a time before it is displayed to a user) such that the virtual display sequence can be displayed to the user in response to the crash event, without the need to render the sequence in real time. As such, the virtual display sequence may be ready to be deployed to the user immediately after the crash event. In this way, playback of virtual display content is provided to the user for a continuous period of time after the crash event, thereby preventing a sudden jarring sensation of a sudden stop in the visual display.

The step of pre-rendering may comprise rendering display data ahead of time (i.e. the intended display time) to produce the rendering future virtual display content. In some examples, the step of rendering future virtual display content comprises using at least one rendering algorithm which may employ one or more pre-rendering techniques in order to render the future virtual display content. In some examples, the step of rendering the future virtual display content comprises using a machine learning model. In particular, the method may comprise predicting future display content over a predetermined time period from the current point in time and rendering the predicted future display content. The prediction may be based on one or more of: the current stage of gameplay, the progression of gameplay over a preceding time period, historical user data, for example historical user gameplay data.

In some examples, the method may further comprise tracking the orientation of the VR headset after the crash event and displaying the virtual display sequence according to the orientation.

In this way, the virtual display sequence is customised to the user's head orientation at the given time of the crash event. As such, there will be a smooth transition between the virtual display content before the crash event and the virtual display sequence displayed after the crash event, thereby reducing the jarring sensation experienced by a user since there is a reduced risk of a sudden change in visuals. In some examples, the method may comprise tracking at least one of the position, motion and orientation of the VR headset after the crash event and displaying virtual display sequence according to the at least one of position, motion and orientation.

In some examples, the virtual display content representing the virtual environment may comprise a plurality of image aspects and the step of rendering future virtual display content comprises rendering the plurality of image aspects in the future virtual display content such that the virtual display sequence comprises the of image aspects.

The term "image aspects" (or image components) refers to visual features in virtual display content and can include, for example, objects, background images, shading, textures, shadows, depth of field, motion blur, caustics, refraction, diffraction etc. By rendering image aspects of the future virtual display content ahead of time, the transition from the virtual display content to the virtual display sequence is smooth, thereby reducing a jarring stopping effect after a crash event. Rendering all the aspects of the future display content may be referred to as fully rendering the future virtual display content.

In some examples, the virtual display content representing the virtual environment may comprise a plurality of image aspects and the step of rendering future virtual display content comprises rendering only a selection of the total number of image aspects such that the virtual display sequence comprises the selection of image aspects.

In examples where only a selection of the total number of image aspects are rendered, it may be referred to as partially rendering the future display content. In other words, there is a fewer number of image aspects in the partially rendered future virtual display content than is rendered in the virtual display content itself. As such, by pre-rendering only a few aspects of the future virtual display content, the computational power and time required when rendering the future display content is less than that required to render all of the aspects of the future display content, while still providing a virtual display sequence that follows continuously from the pre-crash virtual display content to prevent a sudden stop.

In some examples, the step of rendering future virtual display content may comprise rendering a wireframe of at least one image feature (or "object") in the future virtual display content such that the virtual display sequence comprises a wireframe of the at least one image feature.

Preferably the method comprises rendering only the wire frame and not a texture or surface rendering of one or more of the image features (or "objects"). The term "image feature" refers to an element of the virtual display content. For example, an image feature may comprise any one of the background or foreground objects in the display content such as trees, buildings, rivers etc, game characters, character accessories etc. Rendering a wireframe refers to rendering only an outline of one or more above-described image features. As such, lines, arcs, and segments may make up the structure of the wireframe. In a specific example, the virtual display content may comprise a tree wherein only the wireframe of the tree is rendered and displayed in the virtual display sequence. By pre-rendering the outline of image features only, the computational power and time required when rendering is reduced as is the storage required to store the pre-rendered visual content sequence.

In some examples, the step of rendering future virtual display content may comprise rendering virtual display content representing the virtual environment over a predetermined time period stating at a current point in time, wherein the number of image aspects rendered is reduced over the predetermined time period, such that the number of image aspects in the virtual display sequence gradually reduces during playback of the virtual display sequence.

By gradually reducing the number of image aspects of the virtual display sequence, a "fading out" effect of the aspects displayed in the virtual display sequence is provided to the user. In this way, the user experiences a slow fading out of the virtual environment thereby reducing a the effect of a sudden and jarring stop in visual content.

In some examples, the future virtual display content may be rendered so as to gradually reduce the resolution of the rendered virtual display sequence during display.

By gradually reducing the resolution of the virtual display sequence, a "fading out" effect of the virtual display content is provided to the user. In other words, the image features become less distinguishable by the user during playback since they become more blurred. The image may gradually disappear to a display only a blank or coloured display. In this way, the user experiences a slow fading out of the virtual environment by slowly reducing movement of the display content until it comes to a stop, thereby reducing a jarring stop in visual content.

In some examples, the rendered virtual display sequence may comprise a plurality of consecutive frames and the step of displaying the rendered virtual display sequence comprises reducing a frame rate of the virtual display sequence until the playback of display content stops.

Video content often comprises a number of static images referred to as frames. The term "pre-rendered frame" refers to a static image that is rendered ahead of time. Therefore, the virtual display sequence comprises a number of pre-rendered frames, i.e. a sequence, of frames that have been rendered ahead of time, such that the sequence is ready to be deployed after crash event, without the need to render in real time.

By gradually reducing a frame rate (i.e. the frequency at which the frames are displayed) prevents a rapid change in the visuals provided to the user. A jarring sensation occurs when the body is not experiencing motion or accelerating forces consistent with those visually perceived, therefore by gradually slowing down the frame rate the user's experience of motion is more closely linked to the signals received from the user's eyes thereby reducing the risk of jarring sensation experienced by a user after a crash event by slowing the visuals down gradually.

In some examples, the future virtual display content may comprise a plurality of consecutive frames, and wherein each frame of the virtual display sequence is based on at least a frame of the plurality of consecutive frames.

In this way, the virtual display sequence will comprise a number of frames identical or similar to the frames in the future virtual display content. Therefore, when the virtual display sequence is displayed to the user after a crash event, the scenery provided to the user will be similar to that which they previously experienced during display of the virtual display content such that there will be a smooth transition of visual content from the virtual display content to the display content sequence. As such, the risk of the user experiencing a jarring sensation after a crash event is reduced.

In some examples, the crash event may comprise at least one of: an error event comprising an error in a computer code of the virtual display content; and a shutdown event comprising a sudden stop in a received data of the virtual display content.

Crash events are particularly common when game engineers are running and testing the code for a virtual reality game. These crash events occur when there is an error or a bug in the code which stops the computer program from running, and therefore stopping a system from receiving display content, resulting in a sudden stop of content. Similarly, if the code is turned off by the engineer, for example, when they have observed the part of the game they wanted to test, then a shutdown event will occur. User's may induce a shutdown event when they suddenly turn off or power off the game in the middle of gameplay.

In some examples, the method may comprise storing the virtual display sequence in a buffer memory and retrieving the virtual display sequence from the buffer memory. Storing the virtual display sequence in a buffer memory allows for easy access when the crash event happens. Advantageously, by storing the virtual display sequence, it is not required to be rendered at the instance of the crash event and can instead be retrieved quickly and efficiently from the buffer, allowing for instant or near-instant playback of the said sequence at the crash event.

In some examples, the method may comprise performing rendering of the virtual display content on a first processing unit and tracking of the orientation of the VR headset on a second processing unit, where the method involves detecting a crash event affecting the first processing unit. In some examples the method may comprise performing tracking of the orientation of the VR headset on a separate processing thread to the rendering of virtual display content.

The crash event affects the first processing unit thereby causing a stop in the visual content displayed to the user, the second processing unit is unaffected by the crash event, such that head tracking can continue after the crash event. In this way, the virtual display sequence that can be displayed according to the head orientation of the user is unaffected by the crash event and may still be displayed.

In some examples, the method may further comprise obtaining motion data of the user after the crash event and displaying virtual display sequence according to the motion data. The motion data may include one or more of body motion, pupil motion and balance. In this way, there will be a smoother transition between the virtual display content before the crash event and that displayed after the crash event, thereby reducing the jarring sensation experienced by a user when there is a sudden change in visuals.

In some examples, the motion data may represent eye movement of the user. In some examples, the step of obtaining motion data representing eye movement of the user comprises tracking movement of the pupil during display of the pre-rendered virtual display sequence.

Eye tracking may be carried out by continuously measuring the distance between the centre of the pupil and the reflection of the cornea. An infrared light creates this reflection and a camera mounted to the VR headset can be used to track the movements. Computer vision algorithms can be used to determine where the gaze of the eye is directed. The gaze of both eyes meet at a point at a vergence distance. Therefore, using the tracked position of the eyes combined with, for example, the depth of objects in the virtual environment, a model of where the eye is looking can be constructed. In this way, there will be a smoother transition between the virtual display content before the crash event and that displayed after the crash event, thereby reducing the jarring sensation experienced by a user when there is a sudden change in visuals.

In some examples, the method may further comprise tracking movement of the pupil during display of the virtual display content and rendering future virtual display content according to the motion data representing eye movement. Rendering the whole frame of the virtual display content is computationally expensive and will result in large amounts of unnecessary content being rendered that the user will not observe. Even rendering all the elements in the content according to the orientation of the VR headset may be computationally expensive. As such, it is advantageous to render only elements of the environment that the user is looking at the time of or at a time proximal to the crash event. This may result in the image quality in the peripheral vision of the user being reduced.

According to a second aspect of the present invention there is provided a system for compensating for a crash event during display of a virtual environment on a virtual reality, VR, headset, the system comprising: a VR headset configured to be worn by a user, the VR headset comprising a display mechanism configured to display virtual content to a user and a head tracking sensor configured to track the orientation of the VR headset; a processor configured to: receiving virtual display content representing a virtual environment, tracking the orientation of the VR headset, rendering and displaying virtual display content according to the orientation of the VR headset during normal operation, prior to a crash event; rendering future virtual display content associated with a plurality of possible orientations of the VR headset; detecting a crash event, preventing further rendering of virtual display content; and displaying a virtual display sequence based on the rendered future virtual display content after the crash event to prevent a sudden stop in the display of the virtual environment.

The virtual display content may be generated by the system or may be received from an external source by wireless connection.

Preferably, the processor comprises: a first processing unit configured to perform rendering of the virtual display content, the crash event affecting the first processing unit; and a second processing unit configured to track the orientation of the VR headset.

In some examples, the system may comprise at least one of: a display screen; a peripheral device and a user interface. In some examples, the system may comprise a buffer memory for storing the pre-rendered virtual display sequence. In some examples, the system may comprise one or more sensors configured to obtain motion data of the user. In some examples the one or more sensors may comprise an eye tracking sensor for tracking eye movement, wherein the eye tracking sensor is directed towards the eye, and preferably the eye tracking sensor is a camera. In some examples, the head tracking sensor may be an inertial sensor comprising at least one of an accelerometer, a gyroscope, a barometric sensor.

DETAILED DESCRIPTION

Figure 1:
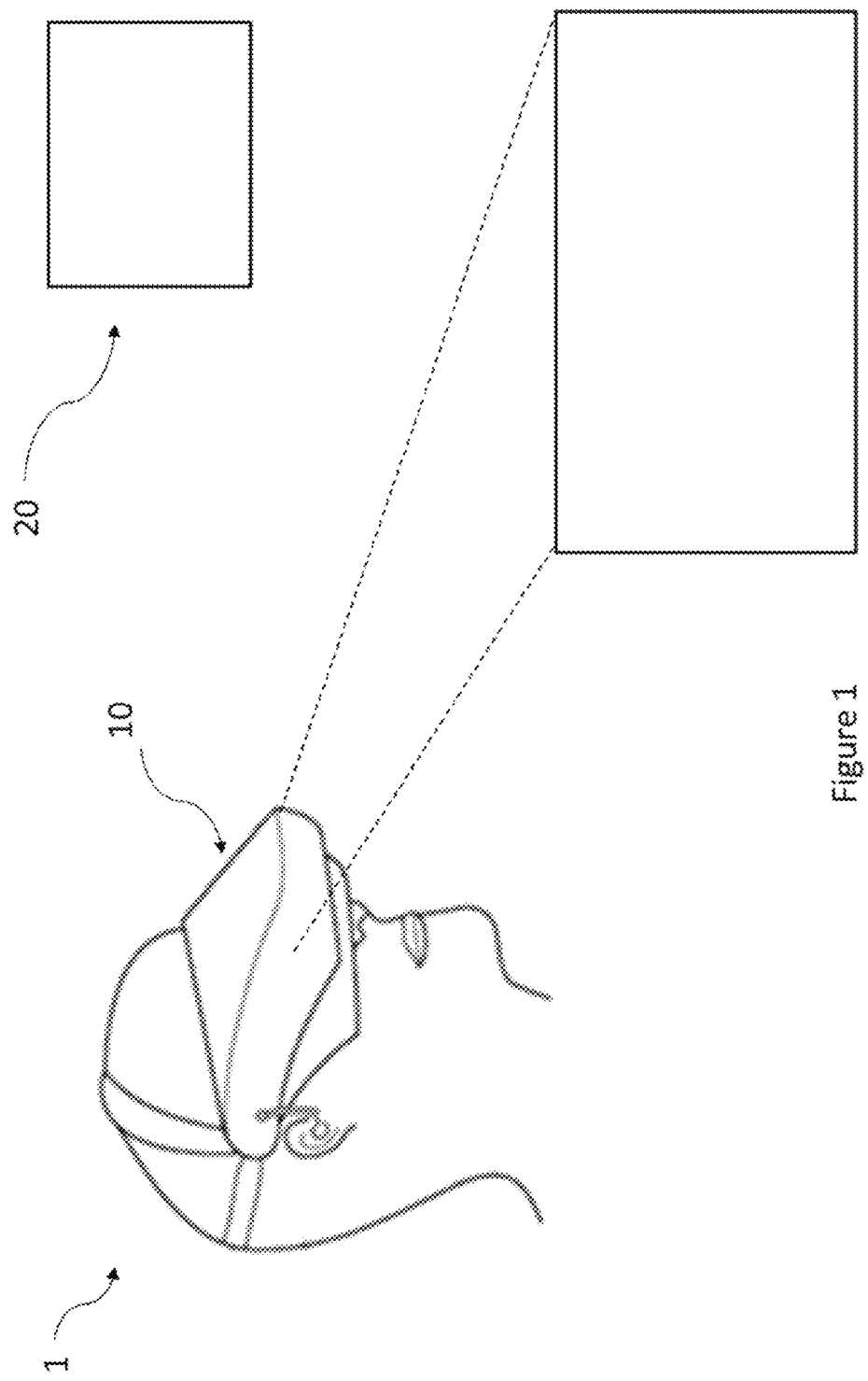
FIG. 1 schematically illustrates a system in which a method according to the present invention may be implemented.

FIG. 1 illustrates a system 1 in which a method according to the present invention may be implemented.

In this example, the system 1 includes a head-mounted display, specifically a virtual reality (VR) headset 10 coupled to a VR console 20. The VR console 20 comprises a computer having at least one processor. The computer may be a game console system, a personal computer, a laptop, a mobile device etc. In some examples, the VR console 20 is configured to execute a video game and/or audio from video game to be provided to the user by the VR headset 10. The VR headset 10 and the VR console 20 are coupled by a wired or wireless connection, alternatively the VR headset 10 and VR console 20 may be the same device. Optionally, the system 1 can include a user interface, and/or peripheral device such as a controller, mouse, keyboard or any other suitable device, and/or can be in communication with a smartphone or other devices.

In FIG. 1, a user is shown wearing the VR headset 10. The VR headset 10 is worn in a similar manner to that of wearing glasses, goggles and is configured to present content to the user, such as a computer generated, 3-dimensional (3D) virtual environment represented by visual display content. VR applications include movies, street-level tours and, in particular, video games, which are displayed using display mechanisms in close proximity to the user's eyes in the VR headset 10. For example, a video game is provided by receiving and rendering the virtual display content of the game at a current point in time so as to display the virtual display content to a user by the display mechanism.

Rendering is the process of generating images from a 2D or a 3D model using a computer program. Rendering can be used in video games to bring together a number of visuals (i.e. image aspects) such as a shadow, lighting effects, textures etc to generate a final result. Real-time rendering is commonly used in games to generate images instantaneously during gameplay at a current time. The virtual environment occupies at least a portion of the field of view of the user, and in some examples, occupies their entire field of view of the user. The VR headset 10 can be used and is in communication with electronic devices, such as a smart phone or multimedia system.

The VR headset 10 in this example includes an electronic display screen as the display mechanism and comprises lenses.

The system 1 may comprise one or more sensors configured to monitor physical characteristics of the user. The VR headset 10 includes a head tracking sensor, allowing the virtual display content to be rendered and displayed virtual display content according to the orientation of the VR headset 10 during normal operation, prior to a crash event, as described at step 102 of FIG. 2. In an exemplary system 1, the head movement/orientation of the user can be tracked using a motion sensor (such as an inertial sensor including gyroscopes, accelerometers, and magnetometers) to obtain tracking data representing the position and/or orientation of the user's head. To prevent crashing of the motion sensing when the crash event occurs, the motion sensing data can be retrieved and/or analysed on a separate thread to the main gameplay. As such, the system 1 may comprise a first processing unit configured for performing the rendering of the virtual display content, and a second processing unit configured for tracking of the orientation of the VR headset.

The crash event will only affect the first processing unit, such that head tracking can continue after the crash event.

The system 1 may optionally comprise one or more other sensors in addition to the head tracking sensor, for example an eye tracking sensor (such as a camera) and/or an internal measurement unit (IMU). The one or more sensors may not be located on the VR headset 10, for example a camera may be coupled to the VR console 20 or a biometric sensor may be located proximal to the user.

Lenses directs light from the electronic display screen so as to map the up-close display to a wide field display and providing a comfortable distant point of focus using one or more optical elements. The optical elements may be apertures, Fresnel lenses, convex lenses, concave lenses, filters and may include any combinations of different optical elements. The lenses may be designed to correct distortion of light received from the electronic display such as chromatic aberration, spherical aberration, barrel distortion etc. The VR headset 10 may additionally include varifocal actuation elements, such as actuators, that cause the lenses to vary the focal length of the VR headset 10 so as to improve the comfort to the user's eye when focusing the light. For example, one or more properties of the lens may be changed in order to change the focal length of the lens. Properties of the lens may include an optical path length, an index of refraction of a lens medium or a shape of the lens.

Audio content may be presented to the user using a separate device (not shown), such as headphones or speakers, that receive audio data from at least one of the VR headset 10 or the VR console 20 or any suitable device.

In one example, the user is wearing the VR headset 10 and is immersed in a VR video game. In a specific example, the user may be a gaming engineer in the process of designing or coding a video game and is using the VR headset 10 to experience the game as a player of the game would be experiencing it. Often, there will be bugs in the code that they are designing which result in a sudden stop or freeze in the visual signal during gameplay, as rendering of the visual content is prevented. The sudden stop of freeze may be referred to as a "crash event". As a result of the crash event, the game engineer may experience a jarring sensation due to the sudden change in visuals, resulting in an overload of their sensory system.

Therefore, to compensate for this crash event, the system 1 can rendering future virtual display content. The future virtual display content is associated with a plurality of possible orientations of the VR headset and is rendered, as described in step 104 of FIG. 2. The future display content is rendered ahead of time (i.e. pre-rendered) and may be rendered over a future period of gameplay from the current point in time. The rendering step s104 can comprise using a rendering algorithm and/or rendering techniques or using machine learning models.

In some examples, the virtual display content comprises a plurality of frames, where each frame is displayed according to the orientation of the VR headset during normal operation, prior to a crash event. In addition to rendering frames of the virtual display content, the system 1 can also render several frames (for example, 5 frames) ahead of time (pre-rendered) over future period of gameplay from the current point in time. These several pre-rendered frames are referred to as future virtual display content which can be stored in a buffer, ready to deploy if a crash event is detected by the system.

In some examples, the future virtual display content stored in the buffer is constantly being overwritten and replaced with the more recently rendered future display content. Rendering of the future virtual display content can be continuous. By continuously pre-rendered future virtual display content, the transition between the virtual display content before the crash event and the displayed virtual display sequence (which is based on the pre-rendered future display content) displayed after the crash event will be a smooth transition, that will likely have, for example, a similar background, foreground and characters to the virtual display content provided to the user before the crash event. Since the rendering happens ahead of time, the user is unable to interact with the pre-rendered framed of the pre-rendered virtual display sequence.

In the above-described example, pre-rendered frames of the future virtual display content can be rendered in the same way that frames of the virtual display content are rendered during gameplay, for example by using the same rendering techniques. This may mean that the pre-rendered frames are rendered in their totality such that the pre-rendered frames comprise all the image aspects that they would comprise had they been rendered in real time during gameplay. Image aspects refer to visual features in the virtual display content and can include shading, textures, shadows, depth of field, motion blur, caustics, refraction, diffraction etc.

In other examples, the future virtual display content comprises a cutscene. For example, a portion of the received virtual display content may be associated with a given cutscene of a game, such that the system may be configured to pre-render this cutscene for the portion of the received virtual display content. As the received virtual display content continues through gameplay, a different portion of the content may be associated with a different cutscene, and this may then be pre-rendered to replace the previous cutscene stored in the buffer. In this way, the jarring sensation is reduced after a crash event by displaying the cutscene stored in the buffer because the cutscene will likely comprise similar features to the virtual display content displayed at the point of the crash event, such that providing this to the user in response to a crash event will prevent a dramatic change in features and visuals. This reduces computational requirements as the future virtual display content is not required to be continuously rendered, but can instead can be rendered at given intervals or periodically.

At S106 the crash event is detected, preventing further rendering of virtual display content. In some examples, the frame rate of the virtual display content may be analysed so as to identify a crash event when a frame rate is below a threshold frame rate. In some examples, a crash event may be identified when the frame rate is above a threshold, or there my be a first threshold wherein a crash event is identified when the frame rate is above the first threshold, and a second threshold wherein a crash event may be identified when the frame rate is below the second threshold. An inconsistency in frame rate is an uncomfortable experience for a user, such that it is advantageous to identify the frame rate above and/or below given threshold values. The threshold value(s) may be selected such that the frame rate is comfortable for the user. Additionally, or alternatively, sudden frame rate drops can be detected or even anticipated from high incoming CPU/GPU loads.

In some examples, the game code may be configured to trigger the presentation of the future pre-rendered display content upon hitting an "exception". An exception is where the programmer has the option to execute code when something has knowingly gone wrong.

Figure 2:
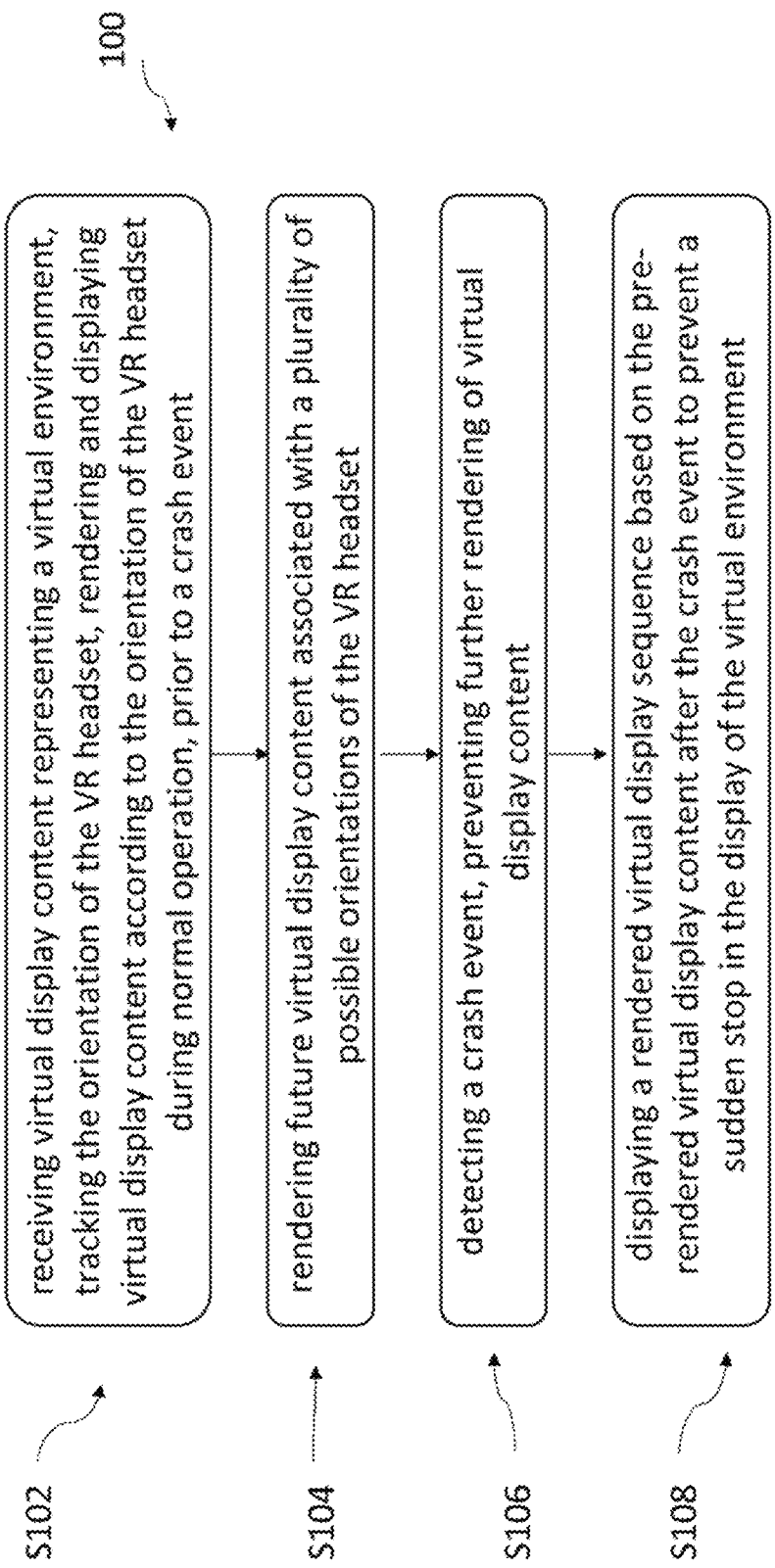
FIG. 2 illustrates a flow chart schematically illustrating steps of a method according to the present invention.

As mentioned above, after the crash event is detected, the virtual display sequence based on the display content is displayed or provided to the user, as described at step 108 in FIG. 2.

In some examples, the frame rate at which the pre-rendered frames of the virtual display sequence are displayed to the user can be decreased over a period of time after the crash event. In this way, the intensity (or rate) at which the visuals change is gradually lowered, thereby reducing the jarring sensation experienced by the user. The frame rate of the pre-rendered frames can gradually be decreased until the playback of display content stops. At this point, the last frame of the pre-rendered virtual display sequence may be frozen on the display, or the screen may turn off and go blank after a given period of time.

There are a number of ways to further reduce the computational intensity of the pre-rendering process. For example, each frame in the visual display content comprises a number of image assets that make up the complete frame that are rendered during the rendering process such as shading, texture, reflections, refractions, caustics, depth of field, motion blur etc. Therefore, to reduce computational power, time and storage space required when pre-rendering the pre-rendered future virtual display content, only a portion of the image assets of future virtual display content may be rendered. In this way step 104 of rendering future virtual display content comprises rendering only a selection of the total number of image aspects such that the virtual display sequence comprises the selection of image aspects.

Take an exemplary frame from a scene of a virtual reality game. In this example, the user will be able to visualise the scene during display of the virtual display content. The frame will be displayed according to the orientation of the VR headset and will be a fully rendered frame, rendered in real time during gameplay of the virtual display content. Many image aspects would have been rendered including shading textures and shadows etc. The image aspect can be rendered using one or more rendering algorithms and techniques, or by using machine learning, to obtain the final fully rendered frame.

If the same frame were to be included in the future virtual display content instead of the virtual display content, it has instead been rendered ahead of time and may render a reduced number of image aspects compared to those rendered when the same frame was included in the virtual display content. In other words, it may be only partially rendered. In this way, the frame may be rendered using a limited or reduced number of algorithms or techniques compared to those which were used to render the frame of the virtual display content. This results in a virtual display sequence that has a reduced number of image aspects.

In some examples, the resolution of the future virtual display content may be reduced. For example, the resolution of the future virtual display content may be set to 50%, 40%, 30% etc of the full resolution. Therefore, a frame included in the future display content will be rendered with a reduced resolution, resulting in a "blurrier" image compared to if the same frame was rendered as part of the virtual display content.

In some examples, a rendering technique may be used to pre-render a wireframe of at least one image feature in the future virtual display content. This includes rendering only an outline of features in the future virtual display content, thereby conserving computation power compared to rendering the full frame.

In some examples, all of the pre-rendered frames in the future virtual display content are rendered in the same way, for example, by applying the same rendering algorithm or technique to all of the frames. In other examples, the number of image aspects rendered is reduced over a predetermined time period, such that the number of image aspects displayed in the virtual display sequence gradually reduces during playback of display content. In other words, the scene may get progressively "emptier" as more and more image aspects are removed during playback of the virtual display sequence. In some examples, the number of image aspects reduce so as to progress towards only a wireframe outline being rendered proximal to the end of the predetermined time period, such that each frame comprises less assets than the frame before until the last frame comprises only a wireframe outline of the image features.

Similarly, in some examples, the degree of blurring may increase over a predetermined period of time. As such, the virtual display sequence may get progressively blurrier as the sequence progresses over a predetermined time period, and may eventually result in a display screen showing a single colour, or a blank screen.

In exemplary systems comprising an audio output device such as headphones or speakers, a supplementary audio may be played to the user in response to the crash event. In this way, a sudden crash in audio is prevent so as to reduce the jarring sensation experience by the user. The supplementary audio may comprise storing a sound from the soundtrack of the game in the buffer ready to deploy at the crash event. In some examples, the audio may be played at the same intensity to the audio played during gameplay of the virtual display content. In other embodiments the audio may gradually decrease in intensity until it stops and can no longer be heard by the user. In exemplary embodiments in which the frame rate gradually reduces, the audio may slow at the same rate as the frame rate.

In some examples, the system obtains motion data of the user by monitoring the user's physical characteristics, using one or more of the sensors described previously. The motion data may include one or more of body motion, pupil motion and balance. In an exemplary system, the eye movement of the user can be tracked using a camera directed at the eye of the user to obtain pupil motion data. The camera can be mounted on the VR headset 10. The motion data may be obtained after the crash event and the virtual display sequence is displayed according to the motion data. To prevent crashing of the motion sensing when the crash event occurs, the motion sensing data can be retrieved and/or analysed on a separate thread to the main gameplay.

In some embodiments, the motion data may be obtained during display of the virtual display content and the exemplary system may be configured to render the future virtual display content according to the motion data. Therefore, by obtaining motion data comprising data on the eye movement and using the data obtained on the head orientation of the user, the system receives a more accurate indication on where the user is looking in the virtual environment and can determine elements in the virtual environment which the user is looking at. Since a sudden change in direction of where the user is looking is unlikely in the short period of time after the crash event, the system can be configured to pre-render elements of the virtual display content that is approximately in the field of view of the user at a time proximal to the crash event or at a time just before.

When pre-rendering the future virtual display content further based on the motion data obtained, the rendering may additionally comprise any of the other rendering techniques explained above. For example, only image aspects in the field of view may be pre-rendered, and these image aspects may be of a reduced resolution compared to the corresponding frame of the virtual display content. In another example, only image aspects in the field of view may be pre-rendered and the image aspects rendered may comprise only a mesh outline of the image features in the corresponding frame. Any combination of rendering techniques described may be used.

The invention claimed is:

1. A method for compensating for a crash event during display of a virtual environment on a virtual reality (VR) headset, the method comprising:
receiving virtual display content representing a virtual environment;
tracking an orientation of the VR headset;
prior to a crash event, rendering and displaying the virtual display content according to the orientation of the VR headset during normal operation;
rendering future virtual display content associated with a plurality of possible orientations of the VR headset;
detecting a crash event that prevents further rendering of virtual display content; and
after the crash event, displaying a virtual display sequence based on the rendered future virtual display content to prevent a sudden stop in the display of the virtual environment.

2. The method according to claim 1, wherein:
the virtual environment is of a videogame at a current point in gameplay; and
rendering the future virtual display content is over a future period of gameplay from the current point in gameplay.

3. The method according to claim 1 further comprising tracking the orientation of the VR headset after the crash event and displaying the virtual display sequence according to the orientation.

4. The method according to claim 1, wherein:
the virtual display content representing the virtual environment comprises a plurality of image aspects; and
rendering future virtual display content comprises rendering only a selection of a total number of image aspects, wherein the virtual display sequence comprises the selection of image aspects.

5. The method according to claim 1, wherein rendering future virtual display content comprises rendering a wireframe of at least one image feature in the future virtual display content, wherein the virtual display sequence comprises a wireframe of the at least one image feature.

6. The method according to claim 1, wherein rendering future virtual display content comprises rendering virtual display content representing the virtual environment over a predetermined time period starting at a current point in time, wherein a number of image aspects rendered is reduced over the predetermined time period to gradually reduce a number of image aspects in the virtual display during playback of display content.

7. The method according to claim 1, wherein the future virtual display content is rendered to gradually reduce a resolution of the rendered virtual display sequence during display.

8. The method according to claim 1, wherein:
the virtual display sequence comprises a plurality of consecutive frames; and
displaying the virtual display sequence comprises reducing a frame rate of the virtual display sequence until the playback of display content stops.

9. The method according to claim 1, wherein the future virtual display content comprises a plurality of consecutive frames, each frame of the virtual display sequence being based on at least a frame of the plurality of consecutive frames.

10. The method according to claim 1, wherein the crash event comprises at least one of:
an error event comprising an error in a computer code of the virtual display content; or
a shutdown event comprising a sudden stop receiving data of the virtual display content.

11. The method according to claim 1, further comprising:
storing the virtual display sequence in a buffer memory; and
retrieving the virtual display sequence from the buffer memory.

12. The method according to claim 1, wherein:
rendering of the virtual display content is performed on a first processing unit;
tracking the orientation of the VR headset is performed on a second processing unit; and
the crash event affects the first processing unit.

13. A system for compensating for a crash event during display of a virtual environment on a virtual reality (VR) headset, the system comprising:
a VR headset configured to be worn by a user, the VR headset comprising a display mechanism configured to display virtual content to a user and a head tracking sensor configured to track an orientation of the VR headset; and
a processor configured to:
receive virtual display content representing a virtual environment;
track the orientation of the VR headset;
prior to a crash event, render and display the virtual display content according to the orientation of the VR headset during normal operation;
render future virtual display content associated with a plurality of possible orientations of the VR headset;
detect a crash event that prevents further rendering of virtual display content; and
after the crash event, display a virtual display sequence based on the rendered future virtual display content to prevent a sudden stop in the display of the virtual environment.

14. The system according to claim 13, wherein the processor comprises:
a first processing unit configured to perform the rendering of the virtual display content; and
a second processing unit configured to track the orientation of the VR headset;
wherein the crash event affects the first processing unit.

15. The system according to claim 13, further comprising at least one of:
a display screen;
a peripheral device; or
a user interface.

16. The system according to claim 13, further comprising a buffer memory for storing the virtual display sequence.

17. The system according to claim 13, wherein the head tracking sensor is an inertial sensor comprising at least one of an accelerometer, a gyroscope, or a barometric sensor.

* * * * *